United States Patent [19]

Koza

[11] Patent Number: 4,482,265
[45] Date of Patent: Nov. 13, 1984

[54] FASTENER FOR INTERCONNECTING VEHICLE DOOR LOCK COMPONENTS

[75] Inventor: Manfred Koza, Raunheim, Fed. Rep. of Germany

[73] Assignee: General Motors Corporation, Detroit, Mich.

[21] Appl. No.: 438,033

[22] Filed: Nov. 1, 1982

[30] Foreign Application Priority Data

Jan. 26, 1982 [DE] Fed. Rep. of Germany ....... 3202433

[51] Int. Cl.³ .............................................. F16C 11/00
[52] U.S. Cl. ....................................... 403/71; 403/70; 403/344; 403/141
[58] Field of Search ............. 292/216, 280; 339/91 R; 74/424.8 A; 285/319, DIG. 22, 197; 24/289, 297; 403/70, 71, 69, 163, 344, 311, 141

[56] References Cited

U.S. PATENT DOCUMENTS 3,832,074 8/1974 Dehar ................................. 403/163
3,926,497 12/1975 Eigenbrode ........................ 339/91 R
4,108,480 8/1978 Ettema ................................. 285/197
4,283,155 8/1981 Yamazaki et al. .................. 403/163
4,306,820 12/1981 Nelson ................................. 403/71
4,406,557 9/1983 Suzuki et al. ........................ 403/71

FOREIGN PATENT DOCUMENTS 1333932 10/1973 United Kingdom .................. 403/71

Primary Examiner—Cornelius J. Husar
Assistant Examiner—Joseph A. Fischetti
Attorney, Agent, or Firm—Herbert Furman

[57] ABSTRACT

A fastener for interconnecting a door lock operating lever and an actuating rod includes two abutting members of plastic material interlocked with each other. The members cooperatively provide a longitudinally extending cylindrical cavity receiving the rod. One of the members has an integral extension which is releasably secured to the operating lever whereby the fastener interconnects the rod and the lever.

5 Claims, 6 Drawing Figures

FASTENER FOR INTERCONNECTING VEHICLE DOOR LOCK COMPONENTS

This invention relates generally to a fastener for interconnecting vehicle door lock components and more particularly to a fastener for interconnecting a door lock operating lever and an actuating rod of a vehicle door handle.

The fastener is comprised of two abutting members of plastic material interlocked with each other. Each member is provided with a longitudinally extending partially threaded semi-cylindrical cavity in an abutting wall thereof. The cavities open to each other and provide a completely threaded annular bore adjustably receiving a threaded portion of the actuating rod when the abutting walls are engaged and the members are interlocked. One of the members additionally includes an integral extension which is releasably secured to the operating lever whereby the fastener interconnects the rod and the lever. The extension can be at any angle or position relative to the one member to compensate for various attitudes of the rod relative to the operating lever.

In one embodiment, the members are interlocked with each other in a transverse direction by providing longitudinally extending ribs on the abutting wall of one of the members adjacent the cavity therein which are received within respective longitudinally extending grooves in the abutting wall of the other member adjacent the respective cavity therein. One of the members is provided with a pair of integral flexible arms which extend laterally from the side walls thereof and through respective lateral grooves in the side walls of the other member to longitudinally align the members and provide the completely threaded bore. The arms are provided with generally hook shaped ends which hook over the remote wall of the other member to thereby longitudinally interlock the members. The hook shaped ends of the arms oppose each other so that the tapered walls of these ends can engage the grooves in the other member to cam the arms apart as they move through such grooves and then integrally snap over the remote wall of the other member. In the other embodiment, the members are hinged to each other and only one arm is provided on the one member to hook over the remote wall of the other member and releasably lock the members to each other.

In the one embodiment, the members are preassembled to each other by providing laterally opening recesses in the side walls of the one member which receive the hook shaped ends of the arms. The recesses are adjacent the grooves. The recesses and ends of the fingers preassemble the members and space the abutting walls thereof. In the other embodiment, the hinge preassembles the members.

In order to assemble the fastener to the components, the extension of one member is secured to the operating lever and then the threaded portion of the rod is inserted into the cavity of such one member. In the first embodiment, the other member is then moved toward the one member to cam the hook shaped ends of the fingers out of the laterally opening recesses and engage the tapered walls thereof with the grooves adjacent the recesses to maintain the arms cammed apart. After the arms pass through the grooves, they snap over the remote wall of the one member as the members abut and the cavities thereof provide a threaded bore releasably securing the rod to the fastener. The cooperating ribs and grooves align and interlock the members transversely of each other and the cooperating arms and grooves align and interlock the members longitudinally of each other. The extension of the one member may alternately be secured to the operating member after the members are secured to the threaded portion of the rod. In the other embodiment, after the threaded portion of the rod is inserted into the cavity of the one member, the other member of the fastener is swung closed relative to the one member to interlock the members and engage the hook shaped end of the arm of the other member with the remote wall of the one member. The partially threaded cavities and the threaded portion of the rod can be replaced by any other type of releasable engaging means, such as alternating circumferential grooves and ribs.

The primary feature of this invention is that it provides an improved fastener for adjustably interconnecting a door lock operating rod and operating lever, with the fastener being formed of two molded plastic abutting members which are releasably interlocked with each other. Another feature is that it provides such a fastener wherein the members have cooperating cavities in abutting walls thereof which define an annular bore for adjustably receiving the operating rod, with one of the members having an integral extension for attachment to the operating lever. A further feature is that the members are interlocked transversely and longitudinally of each other to align the cavities so that partial threads in each provide a continuous thread receiving a threaded portion of the rod.

These and other features of the invention will be readily apparent from the following specification and drawings wherein.

Figure 1:
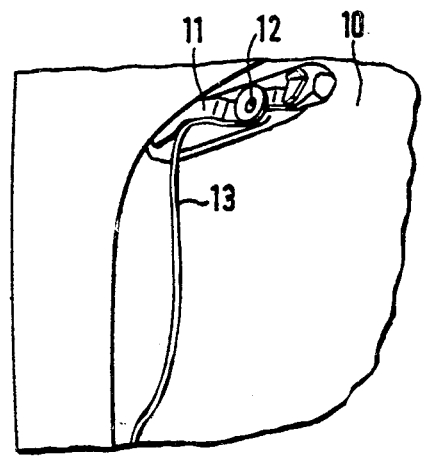
FIG. 1 is a cut-away view of a portion of a vehicle door showing a door handle operating lever and an actuating rod connected thereto.
Figure 2:
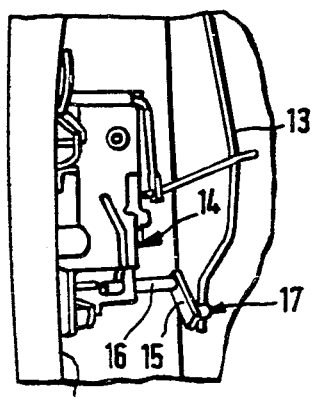
FIG. 2 is a cut-away view of a portion of a vehicle showing a door lock, an operating lever and an actuating rod connected to the operating lever by a fastener according to this invention.
Figure 3:
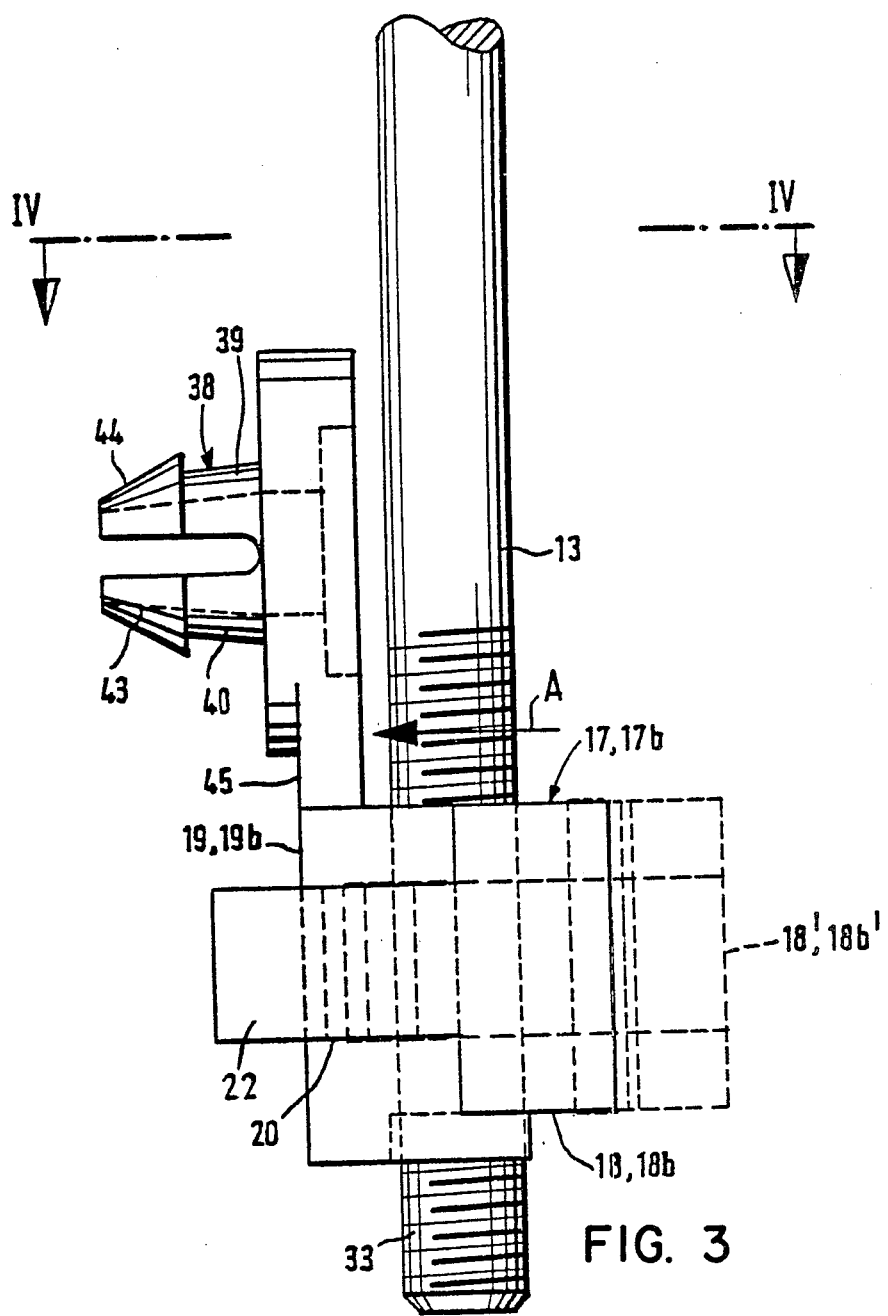
FIG. 3 is an enlarged view of the fastener of FIG. 2.

FIGS. 1 and 2 show portions of the front door 10 of a motor vehicle as viewed from the inside of the vehicle, with the inner door panel being removed. In FIG. 1, a door handle operating lever 11 is pivotally mounted at 12 in the door 10. An actuating rod 13 has one end conventionally coupled to the free end of the door handle operating lever 11 and connects the door handle 11 operationally with the door lock 14 which is also mounted in the door 10, FIG. 2. Door lock 14 includes a door lock operating lever 15 which rotates about pivot axis 16 and is connected to the other end of the actuating rod 13 by a fastener 17 according to this invention. In the one embodiment shown in FIGS. 3, 4 and 6, fastener 17a is comprised of two members 18, 19 of molded plastic material which are interlocked with one another. Member 18 is provided on its two sides with laterally extending latching arms 20, 21, each being provided with a hook shaped latching element or end 22 having a slanted or tapered wall 23. The latching arms 20, 21 are rectilinear and extend parallel to one another.

Figure 4:
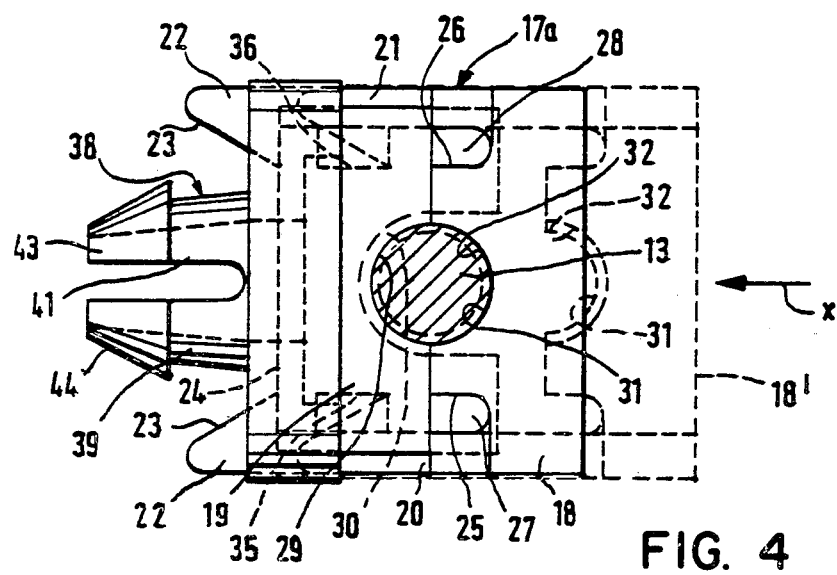
FIG. 4 is a cross-sectional view of one embodiment taken along line IV—IV of FIG. 3.

In the fully assembled and interlocked position of the members, which is indicated in FIG. 4 by the solid lines, each latching arm 20, 21 extends along a respective side wall of the member 19 and through respective grooves in such side walls for latching engagement with a remote end wall 24 of member 19. The cooperation of the latching arms 20, 21 and the grooves in side walls of member 19 longitudinally align and interlock the members 18, 19 with one another. As shown in FIG. 4, member 18 is provided with longitudinally extending recesses 25, 26 located respectively, immediately adjacent the latching arms 20, 21. The recesses 25, 26 receive respective lugs or ribs 27, 28 which are complementary in shape and are formed in member 19 to transversely align and interlock members 18 and 19.

Figure 6:
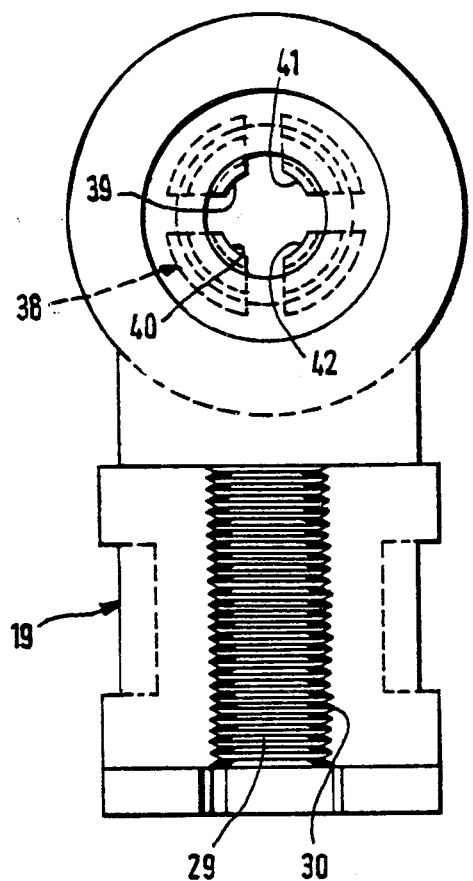
FIG. 6 is a partial sectional view taken along arrow A of FIG. 3.

As shown in FIGS. 4 and 6, the abutting wall of member 19 is provided with a semi-cylindrical longitudinal cavity 29 having transverse grooves 30 machined into its surface area. The abutting wall of member 18 is provided with a complementary longitudinal cavity 31 having corresponding transverse grooves 32. In the assembled interlocked position, as shown in FIG. 4, the cavities 29, 31 of the abutting walls cooperate to form a cylindrical threaded cavity receiving the threaded portion 33 of the actuating rod 13. The cavities 30 and 31 are respectively located between ribs 27, 28 and between recesses 25, 26.

The preassembled position of the members 18 and 19 is illustrated in dotted lines in FIG. 4. In this position, two laterally opening recesses 35, 36, one in each side wall of member 19, receive a hook shaped end 22 of a respective latching arm 20, 21 to preassemble the members. When the member 18 is moved in the direction of arrow X to assemble the members, the walls 23 of the latching arms 20, 21 cam the arms transversely of member 19 and out of the lateral recesses 35, 36 as the ends 22 enter grooves A. The arms remain cammed apart until the ends engage the remote wall of member 19. Thus, this embodiment has a preassembled position for ease of assembly to the rod 13.

Figure 5:
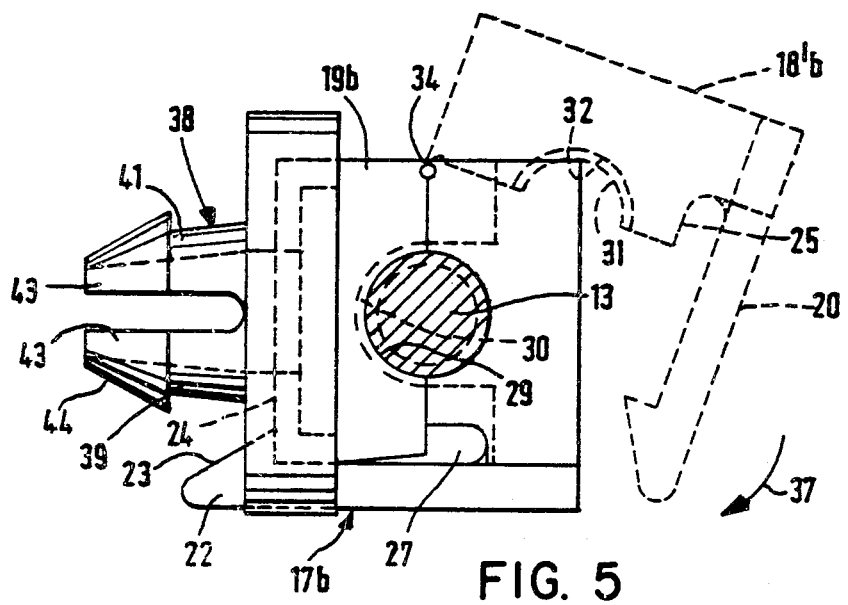
FIG. 5 is a view similar to FIG. 4 of another embodiment.

The other embodiment shown in FIG. 5 differs from that shown in FIG. 4 in that member 18b includes only one latching arm 20 and the members 18b, 19b are pivotally connected by hinge 34 so as to form a preassembled fastener that may be manufactured, such as by injection molding, in one single operation. All other features of the other embodiment shown in FIG. 5 correspond to the one embodiment shown in FIG. 4 and are designated by the same references numerals. In FIG. 5, the assembled and interlocked position of the members 18b, 19b is illustrated by solid lines.

In the other embodiment shown in FIG. 5, the members are fully assembled and interlocked by pivoting member 18b about hinge 34 in the direction of arrow 37 until the end of the latching arm 20 moves through the groove in the side wall of member 19b and snaps over the remote wall of member 19b. The rod 13 is assembled to the fastener in the first embodiment by positioning the threaded portion 33 of the rod within the threaded cavity 29, 30 of member 19 when the members 18 and 19 are in the preassembled position. The same is also true in the second embodiment. Alternatively, the threaded portion of the rod may be assembled to the member 18 or 18b.

In order to connect the fastener with the door lock operating lever 15, the fastener is provided with a segmented headed member 38 formed integral with the member 19 or 19b. As shown in FIG. 6, the member 38 is axially slotted to provide four circumferentially spaced arcuate segments 39, 40, 41 and 42 at their free ends with respective undercut head segments 43 having cone surfaces 44. The latching means 38 is formed integral with arm 45 of member 19 or 19b and may be located at various positions and attitudes relative to such member. The member 38 is assembled to the door lock operating lever 15 by forcing the head thereof through an opening in the door lock operating lever 15 as the segments of such member radially flex.

The embodiments of the invention in which an exclusive property or privilege is claimed are defined as follows:

1. A fastener for adjustably connecting a threaded actuating rod to a door lock operating lever comprising, a pair of members of plastic material, each of said members having an abutting end wall, a remote end wall, and spaced side walls connecting said abutting and said remote end walls, each side wall of one of said members being respective to and paired with a side wall of the other of said members, each of said members including a partially threaded cavity in said abutting end wall thereof, said cavities opening to each other and cooperatively providing a threaded bore for threadedly receiving the rod when said members are assembled with said abutting end walls engaging each other and said respective paired side walls of said members being adjacent each other, first means interconnecting said abutting end walls of said members for locating said members in a direction transverse of said cavities and for securing said members to each other against movement in said transverse direction, second means interconnecting said adjacent respective paired side walls of said members on one side of said fastener for locating said members in a direction longitudinally of said cavities and for securing said members to each other against movement in said longitudinal direction, said second means including a latching arm on a side wall of one of said members extending from said one side wall through a groove in a respective paired side wall of the other of said members and having a portion engageable with said remote end wall of said other member, third means inteconnecting said adjacent respective paired side walls of said members on the other side of said fastener for locating said members in said longitudinal direction and for securing said members against movement in said longitudinal direction, and means on one of said members for attaching said fastener to the lever, said fastener providing the sole connection between the actuating rod and the operating lever.

2. A fastener for adjustably connecting a threaded actuating rod to a door lock operating lever comprising, a pair of members of plastic material, each of said members having an abutting end wall, a remote end wall, and spaced side walls connecting said abutting and said remote end walls, each side wall of one of said members being respective to and paired with a side wall of the other of said members, each of said members including a partially threaded cavity in said abutting end wall thereof, said cavities opening to each other and cooperatively providing a threaded bore for threadedly receiving the rod when said members are in assembled position with said abutting end walls engaging each other and said respective paired side walls of said members being adjacent each other, means interconnecting said abutting end walls of said members for locating said members in a direction transverse of said cavities and for securing said members to each other against movement in said transverse direction, a latching arm on each side wall of one of said members extending from said one side wall through a groove in a respective paired side wall of the other of said members and having a portion engageable with said remote end wall of said other member to releasably secure said members to each other in assembled position, said latching arms and said grooves extending transversely of said cavities and cooperatively locating said members in a direction longitudinally of said cavities and securing said members to each other against movement in said longitudinal direction, and means on one of said members for attaching said fastener to the lever, said fastener providing the sole connection between the actuating rod and the operating lever.

3. A fastener for adjustably connecting a threaded actuating rod to a door lock operating lever comprising, a pair of members of plastic material, each of said members having an abutting end wall, a remote end wall, and spaced side walls connecting said abutting and said remote end walls, each side wall of one of said members being respective to and paired with a side wall of the other of said members, each of said members including a partially threaded cavity in said abutting end wall thereof, said cavities opening to each other and cooperatively providing a threaded bore for threadedly receiving the rod when said members are in assembled position with said abutting end walls engaging each other and said respective paired side walls of said members being adjacent each other, first means interconnecting said abutting end walls of said members for locating said members in a direction transverse of said cavities and for securing said members to each other against movement in said transverse direction, hinge means interconnecting said adjacent respective paired side walls of said members on one side of said fastener to locate said members in a direction longitudinally of said cavities and secure said members to each other against movement in said longitudinal direction, said hinge means permitting said members to be pivoted apart relative to each other to open position and toward each other to assembled position, a latching arm on the other side wall of one of said members extending from said other side wall through a groove in a respective paired side wall of the other of said members, said latching arm having a portion engageable with said remote end wall of said other member to secure said members in assembled position and cooperate with said hinge means to locate and secure said members against movement in said longitudinal direction, and means on one of said members for attaching said fastener to the lever, said fastener providing the sole connection between the actuating rod and the operating lever.

4. A fastener for adjustably connecting a door lock operating lever to a threaded actuating rod, comprising, in combination, a pair of members of plastic material, each member having an abutting end wall, a remote end wall, and spaced side walls inteconnecting the remote and abutting end walls, each side wall of one member being respective to and paired with a side wall of the other member, each member including an elongated partially threaded cavity in the abutting end wall thereof, the cavities opening to each other and cooperatively providing an elongated threaded bore for threadedly receiving the rod when the members are in assembled position with their abutting end walls engaging each other and with the respective side walls of the members being adjacent to each other, a recess in each side wall of one member, a latching arm extending from each respective paired side wall of the other member and having a generally hook shaped end engageable within the recess in the side wall of the one member for releasably securing the members to each other in preassembled position with their abutting end walls and cavities spaced from each other, movement of the members toward each other engaging the abutting end walls to complete the bore as the hook shaped ends of the latch arms snap out of the recesses and over the remote end wall of the one member to releasably secure the members to each other in assembled position, and integral means on one of the members for attaching the fastener to the lever to thereby interconnect the operating lever and the actuating rod.

5. A fastener for adjustably connecting a door lock operating lever to a threaded actuating rod, comprising, in combination, a pair of members of plastic material, each member having an abutting end wall, a remote end wall, and a pair of side walls interconnecting the remote and abutting end walls, each side wall of one member being respective to and paired with a side wall of the other member, each member including an elongated partially threaded cavity in the abutting end wall thereof, the cavities opening to each other and cooperatively providing an elongated threaded bore for threadedly receiving the rod when the members are in assembled position with their abutting end walls engaging each other and with the respective side walls of the members being adjacent to each other, a groove in each side wall of one member and a recess in each such side wall opening to each groove, a latching arm extending from each side wall of the other member through a groove in the respective side wall of the one member, each arm having a generally hook shaped end engageable within the recess in the respective side wall of the one member for releasably securing the members to each other in preassembled position with their abutting end walls and cavities spaced from each other, movement of the members toward each other engaging the abutting end walls to complete the bore as the hook shaped ends of the latch arms snap out of the recesses and over the remote end wall of the one member to releasably secure the members to each other in assembled position, and integral means on one of the members for attaching the fastener to the lever to thereby interconnect the operating lever and the actuating rod.

* * * * *